United States Patent [19]
Hayashi

[11] Patent Number: 5,277,457
[45] Date of Patent: Jan. 11, 1994

[54] PIPE JOINT

[76] Inventor: Toshiomi Hayashi, 18-7, Omachi Nishi 2-chome, Asaminami-ku, Hiroshima-shi, Hiroshima-ken, Japan

[21] Appl. No.: 809,672

[22] Filed: Dec. 18, 1991

[30] Foreign Application Priority Data

Feb. 22, 1991 [JP] Japan .................. 3-028517

[51] Int. Cl.$^5$ .............................................. F16L 25/00
[52] U.S. Cl. ................................ 285/331; 285/382.2; 285/417
[58] Field of Search ................ 285/382.2, 331, 371, 285/318, 417

[56] References Cited

U.S. PATENT DOCUMENTS

| | | | |
|---|---|---|---|
| 1,921,642 | 8/1933 | Stephenson | 285/331 |
| 1,921,978 | 8/1933 | Leary | 285/381 X |
| 3,796,057 | 3/1974 | Dougherty | 285/331 X |
| 4,053,247 | 10/1977 | Marsh | 285/398 |
| 4,183,555 | 1/1980 | Martin | 285/348 X |

*Primary Examiner*—Dave W. Arola
*Attorney, Agent, or Firm*—Abelman Frayne & Schwab

[57] ABSTRACT

A pair of pipes are joined airtightly and securely through a pipe joint including a cylindrical main body and a pair of contact portions integrally protruded apart from each other in the longitudinal direction of the main body on the central inner wall of the main body individually capable of contacting end surfaces of the pipes, and a pair of retaining portions integrally protruded from inside ends of the contact portions along the longitudinal direction of the main body for clamping joining ends of the pipes in conjunction with the main body, by inserting the pair of pipes between the main body of the pipe joint and the pair of retaining portions from both ends of the main body, and upsetting the pipe joint and the pair of pipes until the pair of retaining portions closely contact each other while projecting the central portion of the main body along with joining ends of the pair of pipes in the radial direction so that the joining ends of the pipes clamped between the projected central portion of the main body and the pair of retaining portion are seamed.

2 Claims, 6 Drawing Sheets

PIPE JOINT

BACKGROUND OF THE INVENTION

As methods for connecting pipes, made of stainless steel, copper, or aluminum, for low-pressure piping in line with each other comprising an exhaust pipe of an automobile, a piping used in an exhaust gas recirculation system to return part of exhaust gas flowing in the exhaust pipe to halfway the air intake system, or a piping for cooling water recirculating between the engine and radiator, as well as a water mains piping, a sanitary piping, and a piping for recirculating air conditioner coolant or refrigerant, there have been known a butt welding method in which end faces of the pipes to be joined are placed opposite one another and welded, a bell and spigot welding method in which pipe ends to be joined are inserted into are pipe joint such as a socket and the pipes and the pipe joint are welded, a screw type in which pipe ends to be joined are threaded and the pipes are screwed each other or through a threaded pipe joint such as a socket or nipple, and a flanged type in which flanges are integrally formed at pipe ends to be joined by welding, and the pipe flanges are connected through retaining pieces such as bolts and nuts.

Furthermore, there have also been known improvement of these basic pipe joining methods, for example, as disclosed in Japanese Patent Publication Laid-open 62-199234/1987 and Japanese Patent Publication Laid-open 1-127124/1989, in which, for some reason, pipe ends or sleeves to be joined are complexly formed and connected.

The above-described pipe joining methods have problems in long-term reliability due to the use of welding, screws, or flanges and of low efficiency of the joining work, in addition to the problems shown below.

When a method for joining pipes by welding is adopted, since the surface of pipe joints or pipes is generally stained with lubricating oil, the working environment tends to be deteriorated due to gases or fumes generated by heating during welding, and it is necessary to select welding conditions in consideration of thermal effects on the pipes. Especially, when pipes with relatively thin walls are joined, thermal effects of welding on the pipes must be sufficiently considered, and the welding work itself tends to be very tedious and poor in productivity. Furthermore, portions at the beginning and ending of welding tend to have defects such as pinholes, requiring thorough quality control work and resulting in an increase in production cost.

When joining pipes using threads, it is necessary to use pipes having wall thicknesses in view of deterioration in strength of the threaded portions. Furthermore, since these connections are less air-tight, it is necessary to use a sealing material to improve the air-tightness, which leads to an increase in number of parts or man-hour.

When joining pipes using pipe flanges, it requires a tedious work because pipe flanges are formed at the pipe ends to be joined by welding or the like. Furthermore, it is necessary to use a sealing material between the joining surfaces of the pipe ends or pipe flanges in order to obtain air-tightness, and retaining parts such as bolts and nuts and the like to retaining the pipe flanges each other, which leads to an increase in number of parts.

In the above-described inventions described in Japanese Patent Publication Laid-open 62-199234/1987 and Japanese Patent Publication Laid-open 1-127124/1989, since it is necessary to use complex-shaped sleeves or pipe joint structures, and the joining portions are deformed towards the inside in the radial direction, these inventions have problems in airtightness when applied to thin-walled pipes.

OBJECT OF THE INVENTION

It is a first object of the present invention to provide a pipe joint which is able to join pipes for low-pressure piping airtightly and securely, with good productivity.

A second object of the present invention is to provide a pipe joint with a high long-term reliability of the connected portion.

A third object of the present invention is to provide a pipe joint of a small number of parts.

A fourth object of the present invention is to provide a pipe joint which can be produced with a high production efficiency.

A fifth object of the present invention is to provide a pipe joining method of good workability and safety using the pipe joint, without polluting the working environment and with an energy-saving effect.

SUMMARY OF THE INVENTION

In accordance with the present invention, there is provided, as a first embodiment, a pipe joint comprising a cylindrical main body inserted with pipes to be joined from both sides, a pair of contact portions integrally protruded apart from each other in the longitudinal direction of the main body on the central inner wall of the main body individually capable of contacting the end surfaces of the pipes, and a pair of retaining portions integrally protruded from inside ends of the contact portions along the longitudinal direction of the main body for clamping joining ends of the pipes in conjunction with the main body.

In this case, a central portion of the main body located between the pair of contact portions may be formed as a barrel section projecting outward in the radial direction. In this case, the barrel section can be formed by bulging.

There is provided according to the present invention, as a second embodiment, a method of joining pipes using the above pipe joint comprising inserting a pair of pipes between the main body of the pipe joint and the pair of retaining portions from both sides of the main body, upsetting the pipe joint and the pair of pipes until the pair of retaining portions closely contact each other, and seaming the joining ends of the pipes clamped between the projected central portion of the main body and the pair of retaining portions.

In the above upsetting step, in order to project only the central portion along with the joining ends of the pipes outward in the radial direction while preventing both ends of the main body from projecting outward in the radial direction, it is effective to push individually both end surfaces of the main body and the pair of pipes towards the central portion in the longitudinal direction of the main body while binding both ends of the main body and the outer peripheral surfaces of the pair of pipes using a pair of upsetting dies having boss cavity.

When the present invention is applied in a piping work or the like to extend an existing pipeline by connecting a long pipe to the pipeline, it is particularly effective to further use grip dies which can be divided in the peripheral direction to retain the outer peripheral surfaces of the pair of pipes in the radial direction.

Therefore, with the first and second embodiments of the present invention, when the pipe joint and the joining ends of the pair of pipes are pushed towards the central portion in the longitudinal direction of the main body, and compressive force in the axial direction exerted on the pipe joint exceeds a predetermined value, the central portion of the main body which is not bound on the outer peripheral surface by the upsetting dies begins buckling symmetric with respect to the axis. In this case, since a pair of contact portions are projected on the central inner wall of the main body apart from each other along the longitudinal direction of the main body, which act to reinforce the central inner wall of the main body, the central portion does not sink towards the inside in the radial direction, but begins projecting to the outside in the radial direction. Then, the central portion of the main body, along with the pair of contact portions and the pair of retaining portions extending from the inside ends of the contact portions in the longitudinal direction of the main body, deforms in a stable barrel mode.

The pipes are individually pushed in towards the longitudinal direction of the main body in association with the movement of the pair of upsetting dies, and the joining ends will not come out from the retaining portions by upsetting the pipe joint. As a result, in association with the projection of the central portion of the pipe joint along with the retaining portions towards outside in the radial direction, the joining ends of the pipes clamped between the main body and the retaining portions also begin bulging towards the outside in the radial direction.

Furthermore, the central portion of the main body, along with the pair of contact portions and the retaining portions, largely projects towards the outside in the radial direction with a deformation behavior of single barrel mode, an outward bending moment in the radial direction due to the compressive force in the axial direction is exerted on the joining ends of the pipes to bulge outside. Then, the pair of retaining portions contact each other, a seaming force begins to be applied to the joining ends of the pair of pipes clamped between the pair of retaining portions and the main body, and the pair of retaining portions contact closely to each other, whereby the pipes achieve a tight seaming condition with good airtightness.

By appropriately selecting the length and shape of the pair of retaining portions, or by adequately selecting the distance between the pair of contact portions, the length of the central portion of the main body not bound by the upsetting dies and the like in consideration of the wall thicknesses of the main body and the pipes, deformation of the pipe joint in the single barrel mode generated during upsetting results in bending perpendicular to the axis of the pipe joint at the central portion of the projection formed by upsetting, and almost no projections are formed from the inner walls of the pipes, with no flowing disturbance in the pipes.

Moreover, by forming the central portion of the main body into a barrel section projecting outward in the radial direction, the central portion and the joining ends of the pair of pipes are easy to be projected outward in the radial direction during upsetting the pipe joint and the pair of pipes.

There is provided according to the present invention, as a third embodiment, a pipe joint comprising a main body including a cylindrical outer cylinder and a pair of inner cylinders individually interference fit inside the outer cylinder in an abutting condition with the outer cylinder and inserted from both ends with joining ends of a pair of pipes to be joined, a pair of contact portions integrally projected on the inner wall of the inner cylinders in the vicinity of the abutting end surfaces of the inner cylinders located at a central portion of the outer cylinder and capable of contacting against the joining ends of the pipes, and a pair of retaining portions integrally projected from inside ends of the contact portions along the longitudinal direction of the inner cylinders and capable of clamping the joining ends of the pipes in conjunction with the inner cylinders.

There is provided according to the present invention, as a fourth embodiment, a method of joining pipes using the above pipe joint, comprising inserting joining ends of a pair of pipes between the inner cylinders and the pair of retaining portions from both sides of the main body, and upsetting the pipe joint and the pair of pipes until the pair of retaining portions closely contact each other, while projecting the central portion of the main body along with joining ends of the pair of pipes outward in the radial direction, so that the joining ends of the pipes clamped between the inner cylinders and the pair of retaining portion are seamed.

Also in this case, using a pair of upsetting dies having boss cavity, it is effective to push individually both end surfaces of the main body and the pair of pipes towards the central portion in the longitudinal direction of the main body while binding both ends of the main body and the outer peripheral surfaces of the pair of pipes. When the present invention is applied in a piping work or the like to extend an existing pipeline by connecting a long pipe to the pipeline, it is particularly effective to use a grip die which can be divided in the peripheral direction to retain the outer peripheral surfaces of the pair of pipes in the radial direction.

In the third and fourth embodiments of the present invention, since the pair of inner cylinders are integrally interference fit with the outer cylinder, the inner cylinders and the outer cylinder will not move relative to each other during upsetting. In these embodiments, the main body in the first and second embodiments comprises the inner cylinders and the outer cylinder. Since the pipe joint inner cylinders of the third embodiment have the same form as the pipe joint of the first embodiment which is divided into two parts at the center, the inner cylinders formed with the contact portions and the retaining portions are very easy to be fabricated.

BRIEF DESCRIPTION OF THE DRAWINGS

FIG. 3 to FIG. 5 are schematic cross sectional views individually showing the joining method of the second embodiment according to the present invention in the order of steps; in FIG. 4 and FIG. 5, since the upper and lower halves are symmetrical with respect to the central line, the lower halves are omitted.

FIG. 12 to FIG. 14 are schematic cross sectional views individually showing the jointing method of the fourth embodiment according to the present invention in the order of steps; in FIG. 12 and FIG. 13, since the upper and lower halves are symmetrical with respect to the central line, the lower halves are omitted.

DETAILED DESCRIPTION OF THE PREFERRED EMBODIMENT

Figure 1:
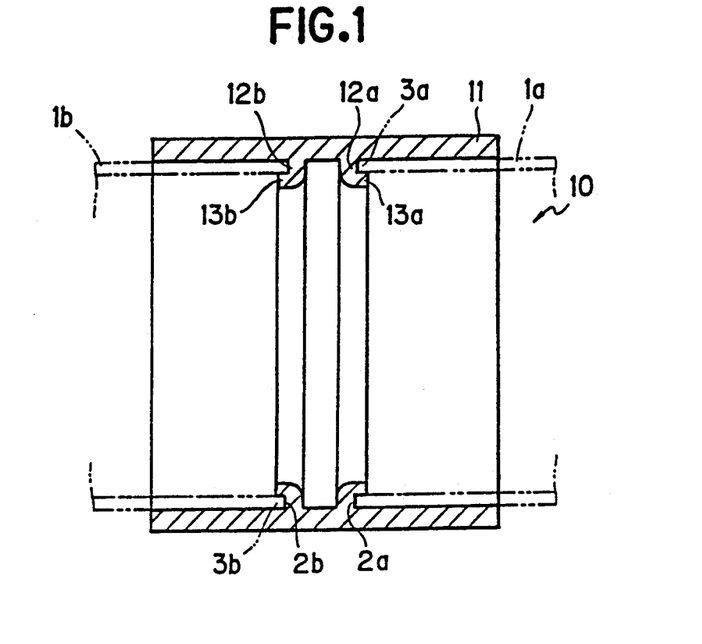
FIG. 1 is a schematic front view of the pipe joint of the first embodiment according to the present invention.
Figure 2:
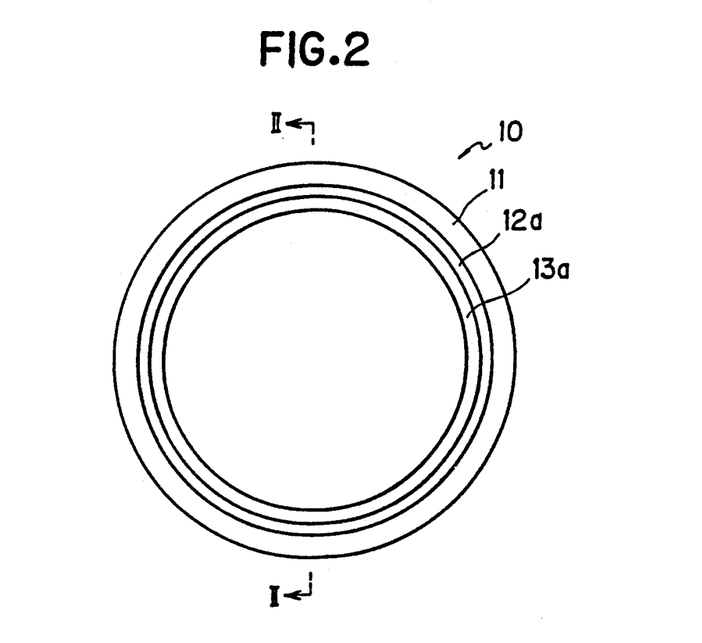
FIG. 2 is a schematic cross sectional view of the pipe joint in FIG. 1 taken along line II—II.

Referring to FIG. 1 and FIG. 2 showing an example of pipe joint of the first embodiment according to the present invention, on a central inner wall of a cylindrical main body 11 into which pipes 1a and 1b to be joined each other, a pair of contact portions 12a and 12b are integrally projected apart from each other in the longitudinal direction (right and left in the figures) of the main body 11, and end surfaces 2a and 2b of the pipes 1a and 1b to be clearance fit into the main body 11 are able to contact the pair of contact portions 2a and 2b. A pair of retaining portions 13a and 13b extending in the longitudinal direction of the main body 11 are integrally projected from the contact portions 12a and 12b, and joining ends 3a and 3b of the pipes 1a and 1b can be clamped between the pair of retaining portions 13a and 13b and the main body 11.

In this example, the central portion of the main body 11 located between the pair of contact portions 12a and 12b has a slightly smaller wall thickness than that of other portions of the main body 11, generally 0.1 mm smaller than other portions of the main body 11.

Figure 3:
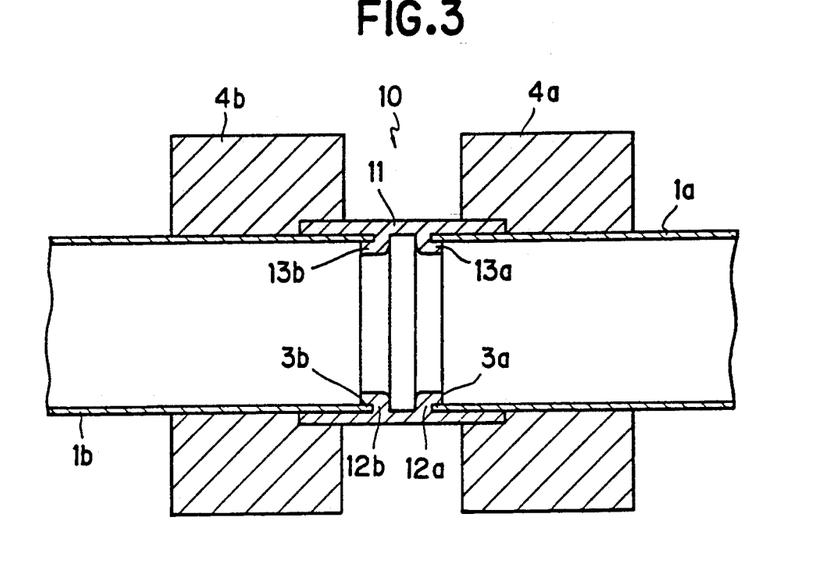
Figure 4:
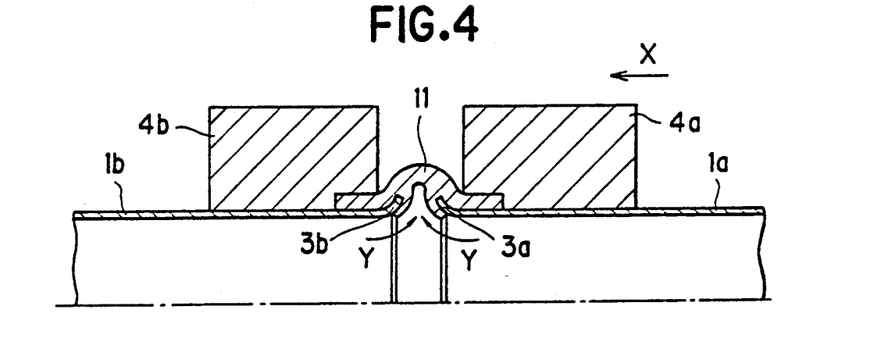
Figure 5:
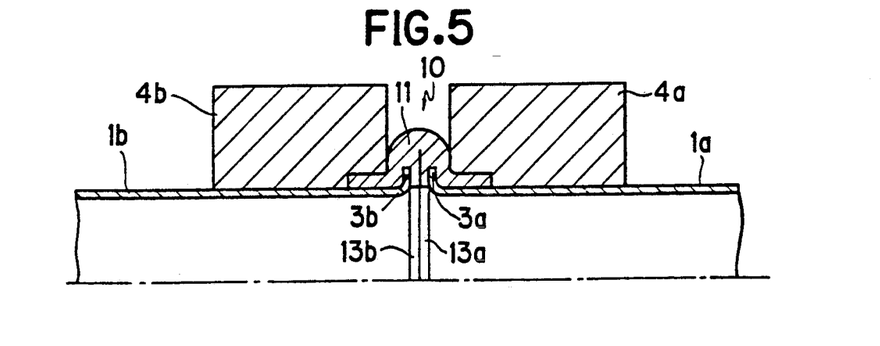

When the pair of pipes 1a and 1b are joined using this pipe joint 10, as shown in FIG. 3 to FIG. 5 showing the joining work, the jointing ends 3a and 3b of the pair of pipes 1a and 1b are inserted between the main body 11 and the retaining portions 13a and 13b from both sides of the main body 11 so that the joining ends 3a and 3b contact the pair of contact portions 12a and 12b, and both ends of the main body 11 and the pipes 1a and 1b are held by a pair of split-structured grip dies 4a and 4b (FIG. 3).

In this case, a pair of holed grip dies 4a and 4b are used, which are structured so that both end surfaces of the main body 11 are individually brought in contact, the outer peripheral surfaces of both ends of the main body 11 are bound by transition fit, and the outer peripheral surfaces of the pipes 1a and 1b can be retained by interference fit more tightly than the fitting with the outer peripheral surface of the main body 11, in order to restrict both ends of the main body 11 from projecting outward in the radial direction and bulge only the central portion of the main body 11, which is not gripped by the grip dies 4a and 4b along with the contact portions 12a and 12b and the retaining portions 13a and 13b, outward in the radial direction along with the joining ends of the pipes 1a and 1b in the subsequent upsetting. It is preferable to roughen the inner peripheral surfaces of the grip dies 4a and 4b contacting the pipes 1a and 1b by rollet processing as needed.

As a result, the outer peripheral surfaces of the pipes 1a and 1b are securely gripped, and friction coefficient between the grip dies 4a and 4b and the pipes 1a and 1b can be increased, so that no slipping of the pipes 1a and 1b occurs in a direction parallel to the longitudinal direction of the pipes.

When the pipes 1a and 1b to be joined are small in length, the outer peripheral surfaces of the pipes 1a and 1b need not be retained by the grip dies 4a and 4b, but may be bound by transition fit nearly same as with the outer peripheral surface of the main body 11, because the pipes 1a and 1b are pressed towards the central portion of the pipe joint 10 by springs or the like from the ends opposite to the joining ends.

After that, when at least one of grip dies having boss cavity 14a is moved by a slide (not shown) to the center side in the longitudinal direction of the pipe joint 10 indicated by arrow X in FIG. 3, a compressive force along the longitudinal direction is applied to the main body 11. When the compressive force exceeds a buckling limit of the central portion of the main body 11, not bound by the grip dies 4a and 4b, the central portion of the main body 11 begins bulging deformation along with the contact portions 12a and 12b and the retaining portions 13a and 13b.

When bulging deformation of the central portion of the main body 11 begins and the portion begins to bulge outward in the radial direction, the contact portions 12a and 12b integrally projected on the inner wall of the main body 11 dislocate outward in the radial direction along with the retaining portions 13a and 13b. In this case, the pipe 11a is also moved integrally in association with the movement of the grip die 14a, however, when the other pipe 11b is of an existing fixed type, the main body 11 and the pipe 11a move to the right in FIG. 3 to FIG. 5, and the joining ends 3a and 3b of the pipes 1a and 1b will not come out from the retaining portions 13a and 13b.

As a result, since the joining ends 3a and 3b of the pipes 1a and 1b are applied with a torque from the inside in the radial direction to the outside through the retaining portions 13a and 13b, the joining ends 3a and 3b also bulge outward in the radial direction along with the central portion of the main body 11, the contact portions 12a and 12b and the retaining portions 13a and 13b.

When the grip die 14a is further pushed in along the arrow X, the central portion of the main body 11, which is deformed in the single barrel mode, is bent to a direction perpendicular to the axis of the pipes 1a and 1b, the pair of the retaining portions 13a and 13b contact each other, the joining ends 3a and 3b of the pipes 1a and 1b are powerfully clamped between the retaining portions 13a and 13b and the main body 11, and seaming deformation begins. From this condition, when the central portion of the main body 11 and the joining ends 3a and 3b of the pipes 1a and 1b are further upset, the central portion of the main body 11 and the contact portions 12a and 12b separating the pair of contact portions 12a and 12b from each other contact closely with each other in a position perpendicular to the axis of the pipes 1a and 1b, and the central portion of the main body 11 and the joining ends 3a and 3b of the pipes 1a and 1b further bulge outward in the radial direction. When the central portion of the main body is completely deformed into a folded condition, the joining ends of the pipes 1a and 1b are seamed securely with good airtightness through the central portion of the main body 11, folded at the center, the deformed pair of contact portions 12a and 12b and retaining portions 13a and 13b (FIG. 5).

In this case, by setting the lengths of the pair of retaining portions 13a and 13b to small values, it is possible to fold these portions into the central portion of the main body 11. As a result, when seaming as shown in FIG. 5 is completed, no portions projecting inside from the inner surfaces of the pipes 1a and 1b are formed, thereby preventing flow of the fluid from being disturbed in the pipes 1a and 1b.

In practice, the contact portions 12a and 12b with projections of 4 mm in lengths and apart by 6 mm from each other were formed at the central portion of a stainless steel main body 11 which is 50 mm in length, 57 mm in outer diameter, and 3 mm in wall thickness, the wall thickness of the central portion of the main body 11 located between the pair of contact portions 12a and 12b was set to 2.8 mm, and the wall thickness of the retaining portions 13a and 13b with lengths of 4 mm was set to 2.5 mm. Using the thus formed pipe joint 10, when stainless steel pipes with an outer diameter of 51 mm and an inner diameter of 47 mm were joined, airtight and secure joining was achieved.

Figure 6:
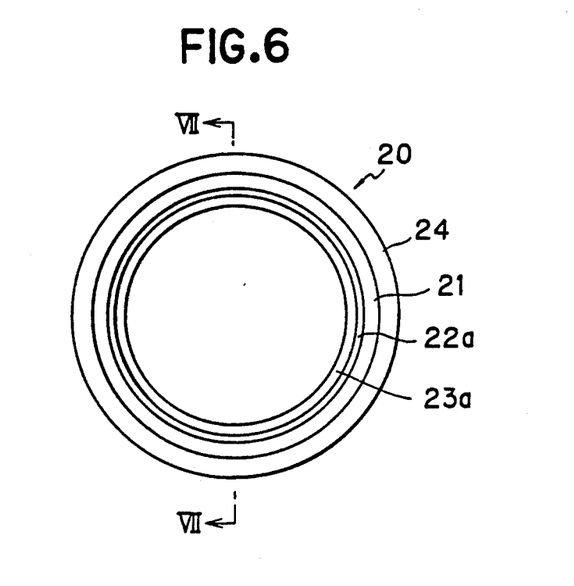
FIG. 6 is a schematic front view of the pipe joint of another example of the first embodiment according to the present invention.
Figure 7:
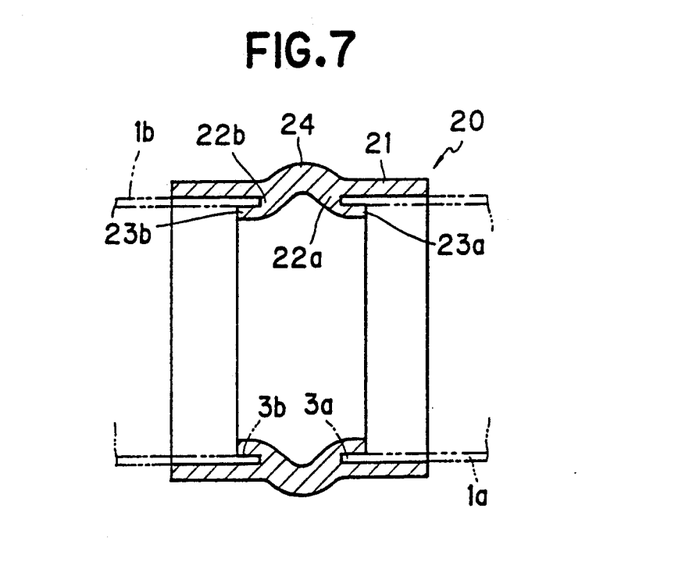
FIG. 7 is a schematic cross sectional view of the pipe joint in FIG. 6 taken along line VII—VII.

Alternatively, in the above upsetting, it is possible to use a pipe joint with the shape as shown in FIG. 6 and FIG. 7 in order to facilitate outward projecting in the radial direction of the central portion of the main body 11 along with the joining ends 3a and 3b of the pair of pipes 1a and 1b.

Specifically, the central portion of a main body 21 located between a pair of contact portions 22a and 22b is formed into a barrel section 24 with a predetermined curvature projecting outward in the radial direction, formed by bulging, cutting or the like. In this example, the inner wall surface between the pair of contact portions 22a and 22b is protruded outward in the radial direction so that the pair of contact portions 22a and 22b are integrally connected, thereby forming the contact portions 22a and 22b in a continuous arc form with no steps on the inner peripheral surface of a pair of retaining portions 23a and 23b.

With this structure, when the pair of pipes 1a and 1b are joined through a pipe joint 20 by the method shown in FIG. 3 to FIG. 5, the central portion of the main body 21 located between the pair of grip dies 4a and 4b is deformed in a favorable bulging mode in association with movement of the grip dies 4a and 4b, thereby achieving smoother upsetting.

In the example of pipe joint 20 shown in FIG. 6 and FIG. 7, wall thickness of the barrel section 24 formed at the central portion of the main body 21 is larger than that of other portions of the main body 21. With such a structure, when the pair of pipes 1a and 1b are joined through the pipe joint 20 by the method shown in FIG. 3 to FIG. 5, the central portion of the main body 21 and the barrel section 24 are easily seamed along with the joining ends 3a and 3b of the pipes 1a and 1b clamped between the contact portions 22a and 22b and the retaining portions 23a and 23b while projecting out in the radial direction in association with movement of the grip dies 4a and 4b, thereby achieving even smoother upsetting than the previous examples.

Figure 8:
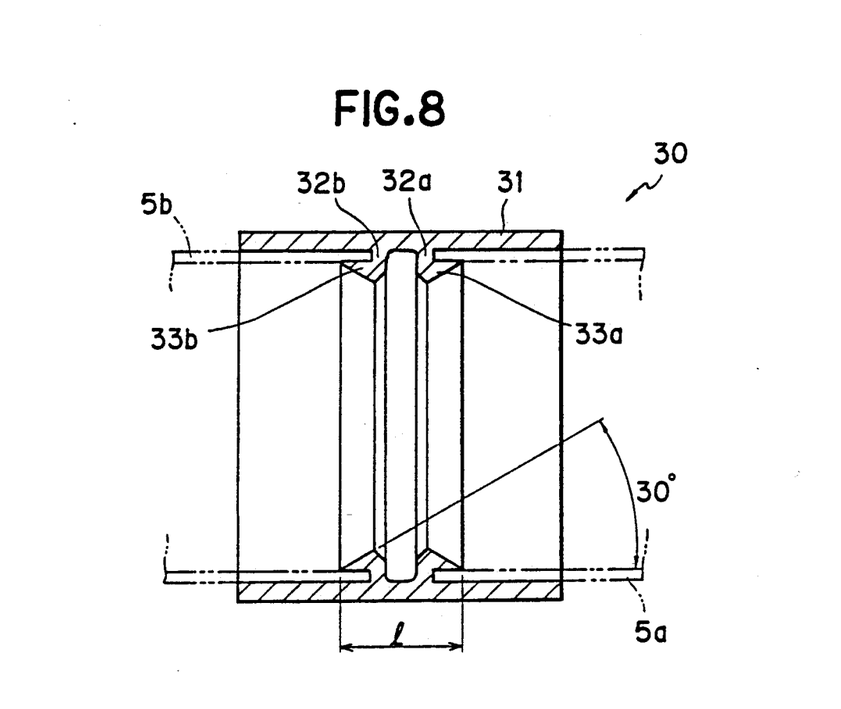
FIG. 8 is a schematic cross sectional view of another example of the first embodiment according to the present invention.

In the example shown in FIG. 6 to FIG. 8, the same parts as used in the example shown in FIG. 1 to FIG. 5 are identified with the same reference symbols.

In the foregoing two examples, upsetting is made until the inner peripheral surfaces of the retaining portions 13a, 13b, 23a, and 23b contact against each other. However, depending on the material or dimensions of the pipes 1a and 1b and the pipe joint 10 or pressure of the fluid flowing within the pipes 1a and 1b, it is not always necessary to upset until the inner peripheral surfaces of the retaining portions 13a, 13b, 23a, and 23b contact against each other.

FIG. 8 is a schematic cross sectional view showing structure of another example of pipe joint of the first embodiment according to the present invention. In this example, a pair of contact portions 32a and 32b are formed apart by 5.5 mm from each other on the inner wall of the central portion of a cylindrical main body 31 formed from a ferrite-type stainless steel pipe 50 mm in length, 57 mm in outer diameter, and 51 mm in inner diameter, and a pair of retaining portions 33a and 33b are formed from the inner peripheral ends of the contact portions 32a and 32b along the longitudinal direction of the main body 31. Inner peripheral surfaces of the retaining portions 33a and 33b are formed as 30° internal cones, and distance l between the front ends is set to approximately 20 mm.

Stainless steel pipes 1a and 1b, 50.8 mm in outer diameter and 1.6 mm in wall thickness, containing 19.16% by weight of Cr, 0.5% by weight of Cu, and 0.49% by weight of Nb, and used in exhaust pipes of automobiles and the like, were inserted from both ends of the pipe joint 30, and the second embodiment of the pipe joining method according to the present invention was carried out using the grip dies 4a and 4b as shown in FIG. 3 to FIG. 5.

Figure 9:
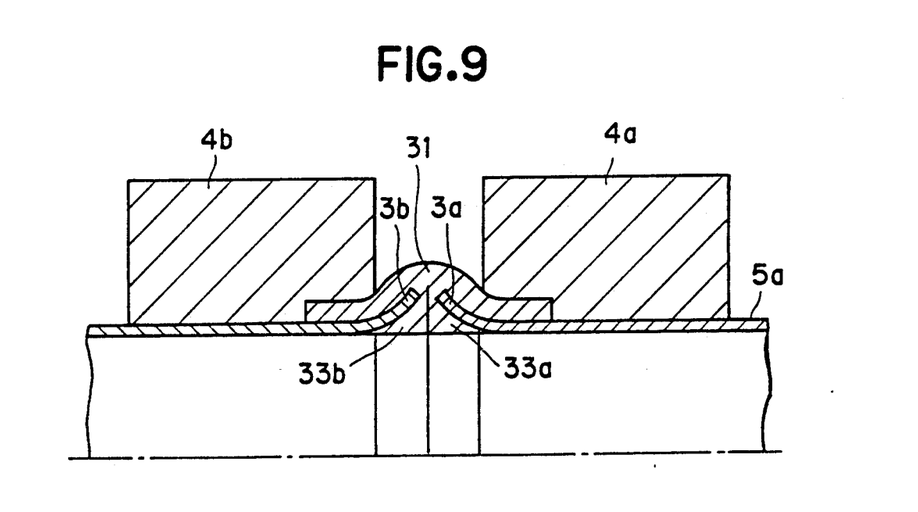
FIG. 9 is a schematic cross sectional view showing the joining condition of pipes and the pipe joint when the pipe joining method of the second embodiment according to the present invention is applied.

As shown in FIG. 9 showing a cross sectional structure at the completion of seaming, even when the inner surface of the central portion of the main body 31 located between the pair of contact portions 32a and 32b are bent and connected with the opposite end surfaces of the contact portions 32a and 32b, and the stainless steel pipes 1a and 1b and the pipe joint 30 complete secure seaming, the inner peripheral walls of the retaining portions 33a and 33b do not contact against each other. Moreover, the inner peripheral surfaces of the retaining portions 33a and 33b are flush with the inner peripheral surfaces of the stainless steel pipes 1a and 1b, and do not project to the inside of the inner peripheral surfaces of the stainless steel pipes 1a and 1b.

In this example, as a result of airtightness tests using nitrogen gas at a pressure of 15 kgf/cm$^2$, nitrogen gas did not leak for an extended period of time, and secure joining comparable to a conventional art socket welding type was also achieved in tensile tests and vibration tests.

In the pipe joints 10, 20, and 30 in the above examples, it is relatively tedious to form the contact portions 12a, 12b, 22a, 22b, 32a and 32b and the retaining portions 13a, 13b, 23a, 23b, 33a and 33b integrally with the inner peripheral surface of the main bodies 11, 21 and 31 by machining such as cutting. On the other hand, a pipe joint 40 shown in FIG. 10 and FIG. 11 can be fabricated relatively easily by pressing.

Figure 10:
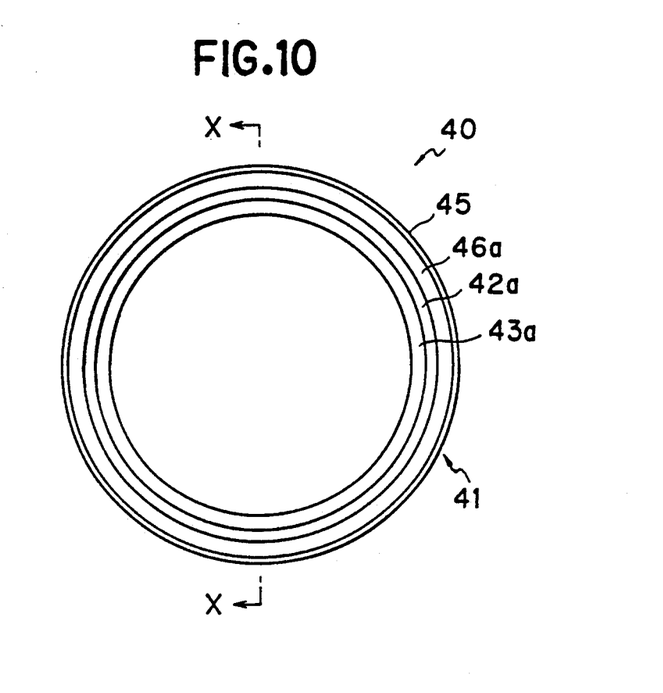
FIG. 10 is a schematic front view of the pipe joint of the third embodiment according to the present invention.
Figure 11:
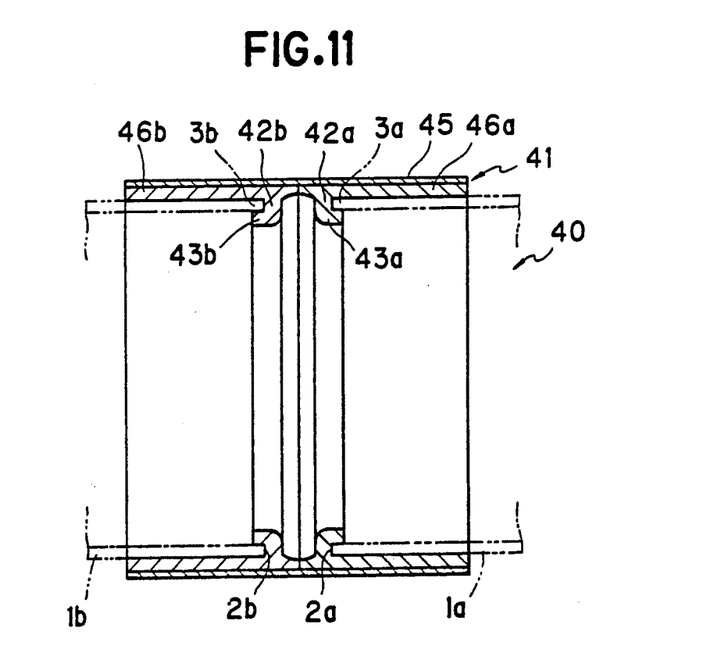
FIG. 11 is a schematic cross sectional view taken along line X—X in FIG. 9.

Referring to FIG. 10 and FIG. 11 showing an example of the pipe joint of the third embodiment according to the present invention, a pair of inner cylinders 46a and 46b are integrally engaged in a cylindrical outer cylinder 45 with their end surfaces in contact against each other, and the outer cylinder 45 and the inner cylinders 46a and 46b form a main body 41. The pair of inner cylinders 46a and 46b are inserted from both ends of the main body 41 with the pipes 1a and 1b to be joined by clearance fit. The contact portions 42a and 42b are integrally projected apart from each other in the longitudinal direction (right and left direction in the figures) on the inner walls of the inner cylinders 46a and 46b in the vicinity of the end surfaces of the inner cylinders 46a and 46b located at the central portion of the main body 41, so that the end surfaces 2a and 2b of the pipes 1a and 1b individually contact against the contact portions 2a and 2b. At the inside ends of the contact portions 42a and 42b, a pair of retaining portions 43a and 43b are integrally projected extending from the contact portions 42a and 42b along the longitudinal direction of the outer cylinder 45, so that joining ends 3a and 3b of the pipes 1a and 1b can be individually clamped by the pair of retaining portions 43a and 43b and the inner cylinders 46a and 46b.

Thus, inner cylinders 46a and 46b of this example are almost the same as the main body 10 shown in FIG. 1 to FIG. 5 divided at the center into two portions. Since this configuration can be formed by pressing rather than cutting or grinding, it is advantageous over the pipe joints 10, 20, and 30 shown above in view of production time and cost.

Figure 12:
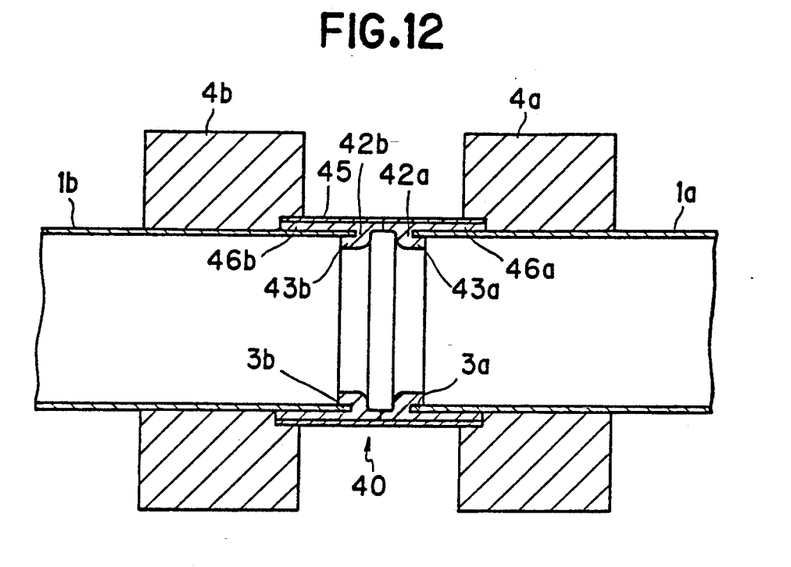
Figure 13:
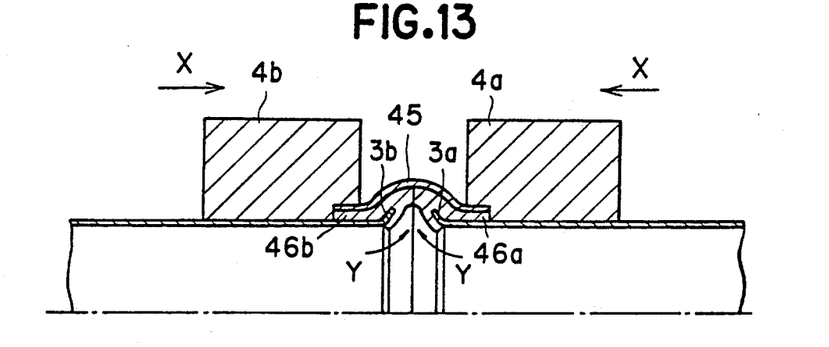
Figure 14:
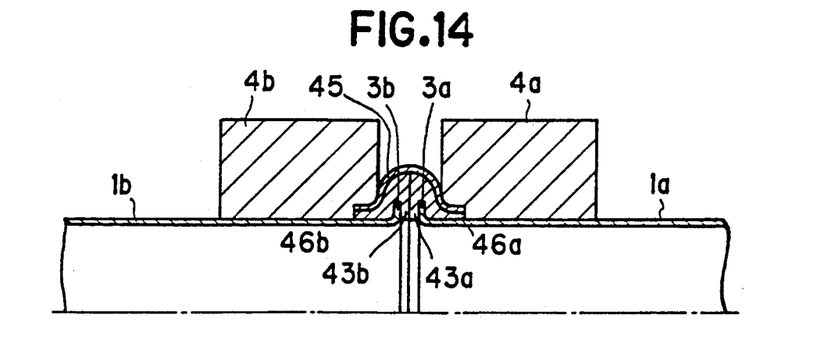

When the pair of pipes 1a and 1b are joined using the pipe joint 40, referring to FIG. 12 to FIG. 14 showing the joining procedure, first the joining ends 3a and 3b of the pair of pipes 1a and 1b are inserted between the inner cylinders 46a and 46b and the retaining portions 43a and 43b, and the outer cylinder 45, both ends of the inner cylinders 46a and 46b, and the pipes 1a and 1b are then individually gripped by a pair of split-structured grip dies 4a and 4b, shown in FIG. 3 to FIG. 5 and similar to those shown above (FIG. 12).

After that, the grip dies 4a and 4b are moved to the center of the pipe joint 40 in the direction of arrow X in FIG. 12 using a slide (not shown). In association with the movement of the grip dies 4a and 4b, the central portion (free side surface) of the outer cylinder 45 integrally engaged with the pair of inner cylinders 46a and 46b with retaining allowances is applied with a compressive force along the longitudinal direction from both ends and a buckling force to the outside in the radial direction shown by the arrow Y in FIG. 13 caused by the pair of pipes 1a and 1b pushed to the central portion in the axial direction. As a result, the central portion of the outer cylinder 45 and portions of the inner cylinders 46a and 46b located at the same positions, along with the joining ends 3a and 3b of the pair of pipes 1a and 1b, begin to project outward in the radial direction (FIG. 13). Since the pipes 1a and 1b are also pushed towards the central portion in the longitudinal direction in association with movement of the grip dies 4a and 4b, the joining ends 3a and 3b bulge outward in the radial direction by a torque directed from the inside to the outside in the radial direction, without coming out from the retaining portions 43a and 43b, in association with dislocation of the retaining portions 43a and 43b.

From this condition, the grip dies 4a and 4b are further moved until the pair of retaining portions 43a and 43b closely contact each other to upset the pipe joint 40 and the pair of pipes 1a and 1b. This causes the joining ends 3a and 3b of the pair of pipes 1a and 1b clamped between the inner cylinders 46a and 46b and the pair of retaining portions 43a and 43b to make bulging deformation largely outward in the radial direction for seaming due to the projecting of the central portion of the outer cylinder 45 and the portions of the inner cylinders 46a and 46b located at the same positions, whereby the pair of pipes 1a and 1b are joined airtightly and securely through the pipe joint 40 (FIG. 14).

What is claimed is:

1. A device for use in forming a coupling between opposed ends of malleable pipe, comprising:
    a tubular sleeve of malleable material having an inner wall and dual radially inwardly extending flanges extending from said inner wall and spaced axially from each other thereby providing said sleeve including said inner wall with a portion intermediate said flanges and said flanges being spaced inwardly of respective opposite ends of said sleeve;
    an annular groove in each said flange defined in part by said inner wall, said respective annular grooves facing the associated said adjacent end of said sleeve and being of a radial and axial extent sufficient to receive a said end of a said malleable pipe;
    whereby, upon axial compression of said sleeve, that portion of said sleeve and said inner wall extending intermediate said radially inwardly extending flanges together with its radially inwardly extending flanges is caused to bulge radially outwardly, further axial compression of said sleeve acting to rotate said radially inwardly extending flanges in opposite directions about a circumferentially extending center line of said respective flanges to bring an initially axially extending inner surface of said respective radially inwardly extending flanges into radially extending juxtaposition with the corresponding initially axially extending inner surface of the other of said radially inwardly extending flange, and to bring said respective initially axially extending inner surface of said respective flanges into abutment with each other, thereby distorting respective ends of said respective pipes positioned within said respective grooves into a radially outwardly extending flanged configuration trapped within said associated flanges of said device.

2. The device of claim 1, in which said sleeve is comprised of two sleeve portions arranged in abutting end-to-end relationship, each said sleeve portion including one of said flanges, said sleeve portions being contained within an outer continuous sleeve of malleable material.

* * * * *